United States Patent [19]

Burkit

[11] Patent Number: 5,201,550
[45] Date of Patent: Apr. 13, 1993

[54] PIPE COUPLING SYSTEM WITH THRUST RESTRAINT

[76] Inventor: John W. Burkit, P.O. Box 19, Kempton, Pa. 19529

[21] Appl. No.: 843,554

[22] Filed: Feb. 28, 1992

Related U.S. Application Data

[63] Continuation-in-part of Ser. No. 643,744, Jan. 22, 1991, Pat. No. 5,092,633.

[51] Int. Cl.$^5$ ............................................. F16L 21/02
[52] U.S. Cl. ..................................... 285/109; 285/370; 285/371; 285/423
[58] Field of Search ............... 285/109, 370, 397, 915, 285/333, 236, 105, 158, 423

[56] References Cited

U.S. PATENT DOCUMENTS

| | | | |
|---|---|---|---|
| 1,887,332 | 11/1932 | Shrum | 285/365 X |
| 3,122,383 | 2/1964 | Hirsch | 285/397 |
| 4,039,210 | 8/1977 | Wood et al. | 285/423 X |
| 4,247,136 | 1/1981 | Fouss et al. | 285/397 X |
| 4,478,437 | 10/1984 | Skinner | 285/370 X |
| 4,606,558 | 8/1986 | Davidson | 285/915 X |
| 4,913,465 | 4/1990 | Abbema et al. | 285/370 X |
| 4,927,189 | 5/1990 | Burkit . | |
| 4,997,212 | 3/1991 | Burkit . | |
| 5,002,317 | 3/1991 | Burkit | 285/156 |
| 5,015,015 | 5/1991 | Fetters | 285/915 X |
| 5,092,633 | 3/1992 | Burkit | 285/109 |

FOREIGN PATENT DOCUMENTS

| | | | |
|---|---|---|---|
| 759508 | 10/1956 | United Kingdom | 285/370 |
| 832566 | 4/1960 | United Kingdom | 285/397 |
| 974115 | 11/1964 | United Kingdom | 285/397 |
| 1414791 | 11/1975 | United Kingdom | 285/370 |

Primary Examiner—Dave W. Arola
Attorney, Agent, or Firm—William B. Noll

[57] ABSTRACT

This invention is directed to the combination of a pair of aligned tubular members joined in end-to-end relationship by an internal expansion coupling device, where such coupling device offers thrust restraint to the combination. Each of the tubular members is characterized by the end thereof having one or more circumferentially disposed recesses about its wall. The coupling device, which cooperates with said recesses comprises an elongated open ended tubular joint member formed from at least one relatively rigid, rectangular sheet-like member, where said member is defined by a pair of opposing sheet ends with a pair of opposing sheet sides. The sheet ends thereof overlap such that the end portions lie contiguous with each other. A continuous circumferential gasket sealing sleeve, formed of an elastomeric material, is provided to overlap each sheet side about each open end of the tubular joint member, where the gasket sealing sleeve is adapted to lie adjacent to and be compressed against the inside wall of the tubular member. Further, means accessible externally thereof are found for expanding the sheet-like member, whereby the sheet ends move circumferentially towards one anther and the extending sheet-like member uniformly urges the elastomeric gasket sealing sleeve against the inside walls of the tubular member thereabout. Finally, means associated with the tubular joint member are provided to engage the one or more circumferentially disposed recesses about the wall of each said aligned tubular member to provide thrust restraint to the combination.

15 Claims, 3 Drawing Sheets

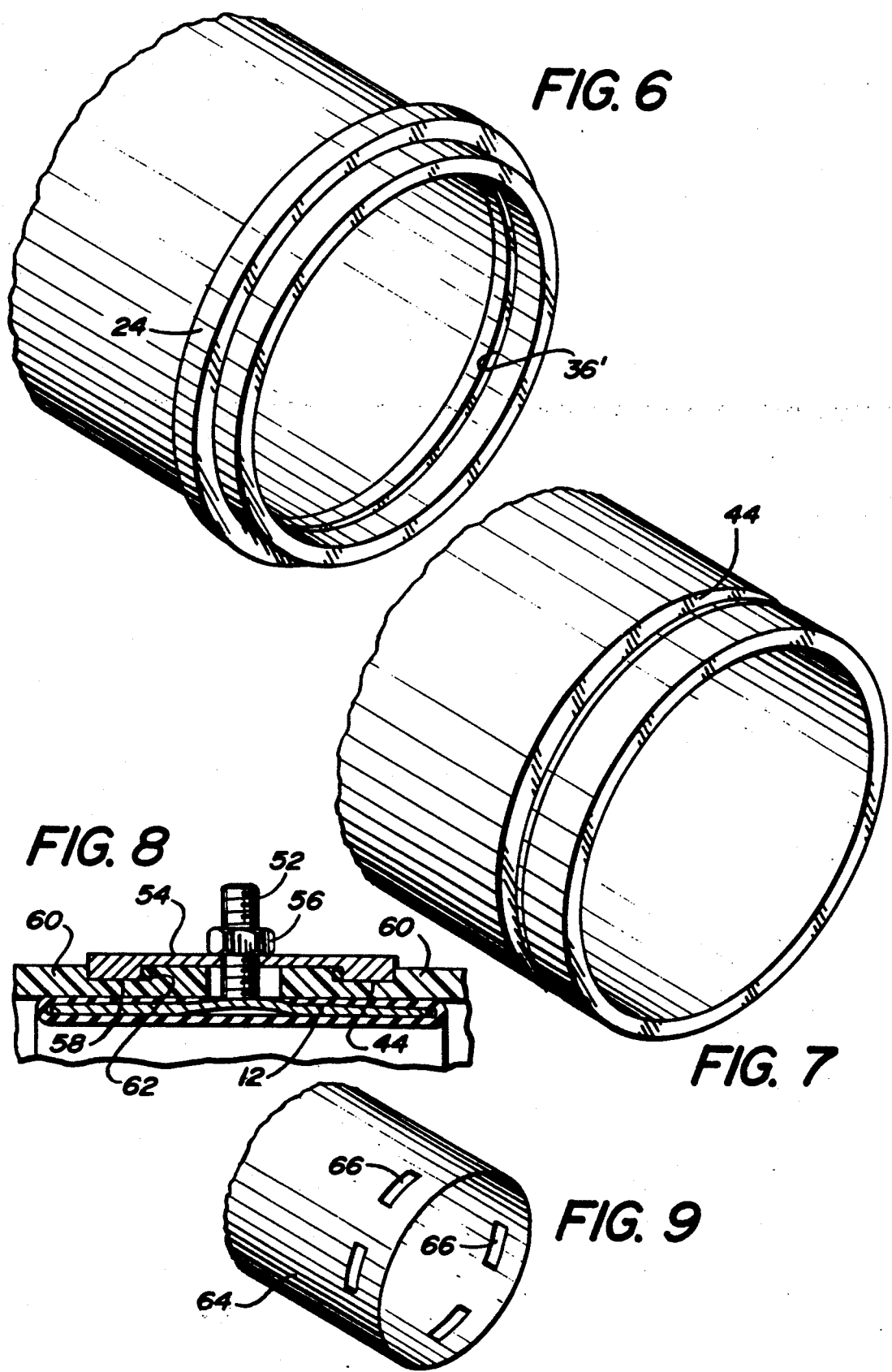

PIPE COUPLING SYSTEM WITH THRUST RESTRAINT

RELATED APPLICATION

This application is a continuation-in-part of copending application Ser. No. 07/643,744, filed Jan. 22, 1991, and entitled "Pipe Coupler With Thrust Restraint" and now U.S. Pat. No. 5,092,633.

BACKGROUND OF THE INVENTION

This invention is directed to the combination of a pair of aligned tubular members joined by an internal expansion coupling device that offers improved thrust restraint, particularly for plastic pipe, such as polyethylene, PCV, and fiberglass reinforced polyester (FRP). Thrust restraint, as used herein, relates to the problem associated with the relative movement, i.e. axial separation, of coupled pipes or tubular members, and the loss of seal or effectiveness of the joint.

It was discovered by the inventor hereof, as exemplified by U.S. Pat. Nos. 4,927,189 and 4,997,212, that tight and effective seals can be achieved by the use of an internal expansion coupling device, as taught therein, especially in relatively static situations. Such device comprises an elongated open ended tubular joint member formed of a relatively rigid sheet-like member, where the ends are turned upon each other in overlapping relationship. A continuous sleeve, formed of an elastomeric material, is provided to overlap the sheet side, where the sleeve, about the circumference thereof, may be provided with at least one continuous upstanding rib which is adapted to lie adjacent to and be compressed against the inside wall of a tubular member. Finally, means for expanding the sheet-like member is provided, whereby the sheet ends move circumferentially towards one another urging the elastomeric sleeve and rib against the inside wall of a tubular member. Such a device has proved successful in effecting a tight seal between the tubular members.

However, there is a strong need in the plastic transmission line industry for an effective coupling system that offers the advantages of ease of assembly and disassembly, tight seal to the flow medium, and thrust restraint. By the nature of the product, particularly such plastics as polyethylene, PVC, and FRP, it has been necessary to follow a very labor intensive and time consuming practice to join plastic pipe. A typical joint for plastic pipe, laid end-to-end, is to apply an external sleeve or fitting socket to the pipe ends, where the sleeve is provided with an internal continuous shoulder or pipe stop for the pipes inserted therein. Since no mechanical devices are used, the sealing thereof has to rely on adhesives. For instance, using PVC as an exemplary pipe material, the surface end portions of the pipes are subjected to a cleaner-primer, the purpose of which is to soften and dissolve the surface to be joined to the sleeve, followed by the application thereto of a solvent cement. Unfortunately, there are numerous precautions or practices which must be followed.

Pipe size, particularly large diameter pipe, is a major factor. For example, the basic solvent cement instructions apply to all sizes of pipe, but when making joints 4" and above, the use of two men to apply the solvent cement simultaneously to pipe and fitting is recommended. Additional men should also be in a position to help "push" the pipe into the fitting socket while the cemented surfaces are still wet and ready for insertion. Thus, labor costs have a significant impact on this traditional manner of joining plastic pipe. There are additional concerns. Alignment of large diameter pipe and fittings is much more critical than when working with small diameter pipe. As the pipe diameters increase, the range of tolerances also increases, which can result in "out of round" and "gap" conditions. Speed in making the joint and applications of heavy coats of solvent cement in these cases is important.

Temperature and atmospheric conditions are further factors to be considered. In cold weather conditions, the typical primers take considerably longer time to penetrate the surface of the plastic. Further, at cold temperatures, it is important to keep the primers and cement, and even the fittings warm. There are just as many problems or concerns under warm weather conditions.

To further complicate this cumbersome prior art practice, cure times will vary with pipe sizes, temperature and humidity conditions. As a practical matter, a complex table of cure times is required for any pipe laying operation. For instance, the cure time for 20" pipe is dry summer-like weather in about 36 hours. The same pipe, under humid but freezing conditions, would require a cure time of from 20 to 24 days, a significant difference. After all this time and effort, and only then, may the coupled pipes be pressure tested. The results at best are good, which would certainly suggest some failures.

The present invention avoids such delays and labor costs with a coupling system that is effective, easily assembled and disassembled, and one that may be used or tested immediately. The coupling system of this invention will become clearer in the description which follows.

SUMMARY OF THE INVENTION

This invention relates to the combination of a pair of aligned tubular members, such as plastic, joined in end-to-end relationship, where the tubular members are joined by an internal expansion coupling device. By means cooperating between said tubular members and said coupling device, improved thrust restraint is achieved. Each tubular member is characterized by the end thereof having one or more circumferentially disposed recesses about its wall. The coupling device comprises an elongated open ended tubular joint member formed from a single, relatively rigid, rectangular sheet-like member, said member being defined by a pair of opposing sheet ends and a pair of opposing sheet sides arranged in overlapping relationship. The sheet-like member is modified to contain a like plurality of raised projections circumferentially arranged for seating in the tubular member reesses. A continuous circumferential gasket sealing sleeve formed of an elastomeric material is provided for overlapping each said seet side about each open end of the tubular joint member, where said gasket sealing sleeve is adapted to lie adjacent to and be compressed against the inside wall of said tubular member. Finally, means accessible externally thereof for expanding the sheet-like member is included such that the sheet ends are caused to move circumferentially towards one another to urge the elastomeric gasket sealing sleeve against the inside walls of said tubular member thereabout.

BRIEF DESCRIPTION OF DRAWINGS

FIG. 6 is a perspective view of third embodiment of a tubular member, such as plastic, to be joined by an expandable joint member according to this invention.

FIG. 7 is a perspective view of one embodiment of a tubular member, exhibiting an outer wall recess, for receiving an expandable joint member modified to include a pressure applying thrust restraint plate.

FIG. 8 is a partial sectional view of a preferred thrust restraint plate for use with the embodiment of FIG. 7.

FIG. 9 is a perspective view of low pressure tubular member, such as a sheet metal conduit for heat and ventilation uses, to be joined by the expandable joint member according to this invention.

DETAILED DESCRIPTION OF PREFERRED EMBODIMENT

Figure 1:
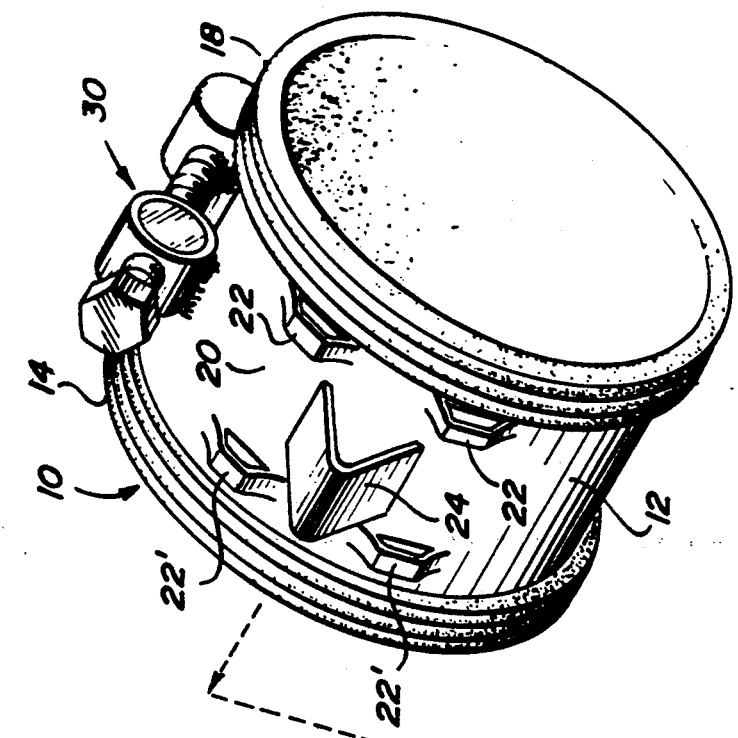
FIG. 1 is an exploded perspective view of a preferred embodiment of the coupling system according to this invention.
Figure 1:
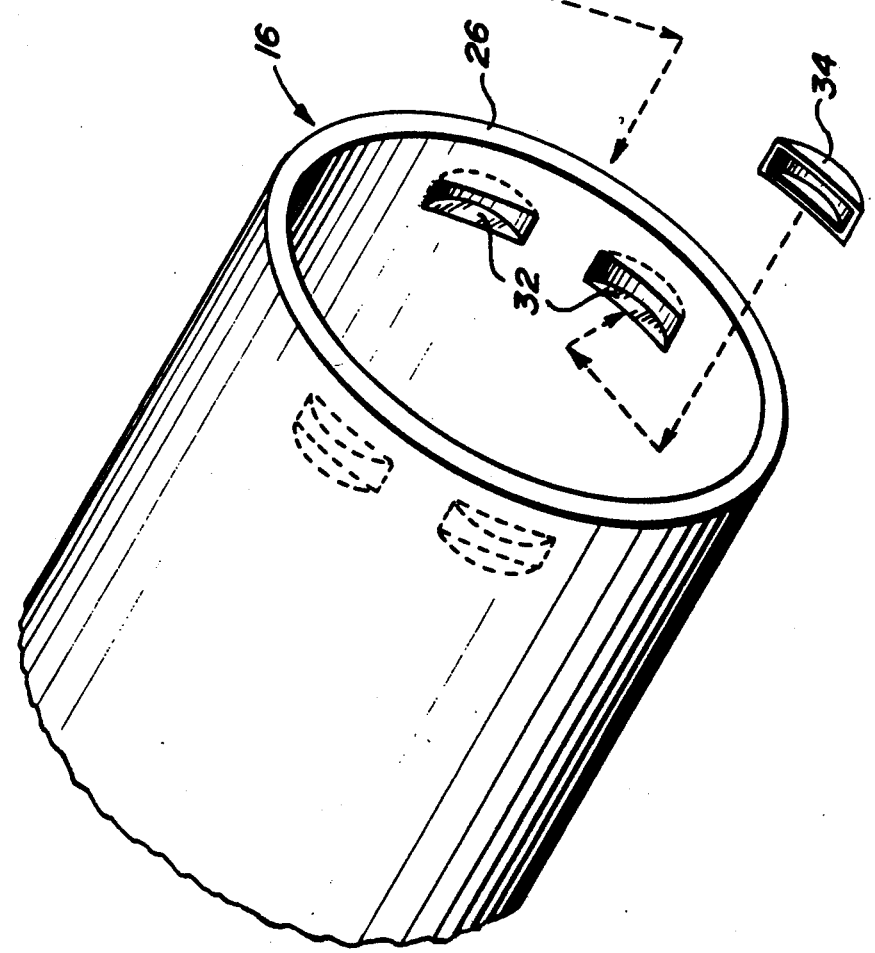

The present invention, as illustrated by the preferred embodiment of FIG. 1, comprises an internal expansion pipe coupling device to provide thrust restraint between a pair of tubular members connected therto, preferably where such members are selected from the group of plastics, such as PVC, FRP and polyethylene.

The coupling device 10, except as modified herein, is described in U.S. Pat. Nos. 4,927,189 and 4,997,212, by the inventor hereof. As illustrated in FIG. 1, the preferred coupling device 10 and this invention comprises an open-ended tubular member or expanding sleeve 12 formed from one or a pair of relatively rigid sheet-like materials, such as plastic, composite material, or metal, i.e. stainless or coated plain carbon steel, wrapped into a cylindrical configuration where the sheet ends overlap and lie contiguous with one another.

The coupling device 10 includes a continuous gasket sleeve 14 about each open end of tubular joint member or coupling device. While each such outer gasket sleeve 14 wraps around its corresponding sheet end, such that the cross-section thereof is U-shaped, it is preferable to connect the inner arms, as illustrated in U.S. Pat. No. 4,927,189, to essentially lie contiguous with the inner wall of tubular member 16. The gasket sleeve is formed of an elastomeric material, such as high quality rubber, or the like. Further, the sleeve, particularly that inner or connected portion, may be provided with circumferentially disposed high strength wires within the sleeve to provide hoop support or strength. The preferred manner would be to place such wires in the sleeve during the molding operation. The outer portion is provided along the surface thereof with rib 18, or scalloped, such as by plural ribs. Preferably, such ribs 18 are pointed, or knife-edged, so as to readily yield and seal upon expansion of the coupling device 10. As by procedures known in the art, the gasket sleeve 14 may be extruded into an endless length, i.e. continuous, and cut to discrete lengths for use herein. The ends thereof may then be vulcanized or joined by a suitable adhesive to form a continuous cylindrical shape. Additionally, it is contemplated by this invention that a bond may be provided between the inner wall adjoining the coupling sleeve 10, where bonding thereof may be effected by vulcanization.

Returning now to FIG. 1, the outer surface 20 of coupling device 10 is provided with plural projections 22,22', arranged in sets in close porximity to the gasket sleeve 14, and circumferentially aligned about the coupling deice 10. In the case of a metal sheet member, the projections 22 may be formed by punching out said sheet member, or by welding thereto. For plastic, or other related materials, the projections may be provided about the surface 20 in the manufacturing process.

Disposed between the sets of projections 22,22', a pipe stop 24 may be provided. That is, as the coupling device 10 is inserted into a pair of aligned tubular members 16, only one being shown in FIG. 1, the edge 26 of tubular member 16 is caused to abut against the pipe stop 24. Finally, as more clearly illustrated and described in U.S. Pat. No. 4,927,189, a coupling device expansion member 30 is provided.

Further, in FIG. 1, the tubular member 16 has been modified by the inclusion of plural recesses 32. The recesses 32, like the projections 22,22', are circumferentially arranged and spaced apart by a distance comparable to the spacing of adjacent aligned projections 22 or 22' to allow for seating in said recesses upon expansion of the tubular number 16. For particular use with plastic pipe, a metal cupped insert 34 is provided for seating within the recesses 32. The inserts 34 may be formed from a sheet metal blank in a manner known in the metal forming art. The inserts provide added strength to the plastic pipe, and minimize any notch sensitivity caused by forming the recesses 32.

Figure 2:
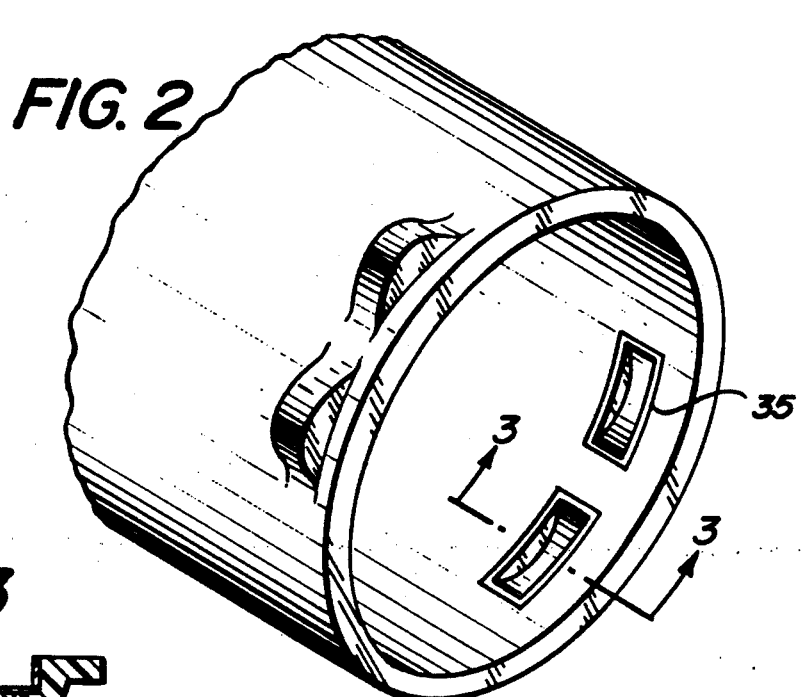
FIG. 2 is a perspective view of an alternate tubular member, such as plastic, to be joined by an expandable joint member according to this invention.
Figure 3:
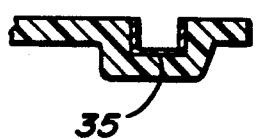
FIG. 3 is a partial sectional view taken along line 3—3 of FIG. 2.

FIG. 2 represents an alternative to the tubular member 16 of FIG. 1. In this embodiment the recesses 35 are formed in the manufacturing process whereby there is no reduction in the wall thickness, as may be found in the embodiment of FIG. 1. The uniformity of the wall is shown in FIG. 3.

Figure 5:
FIG. 5 is a partial sectional view taken along line 4—4 of FIG. 4.
Figure 4:
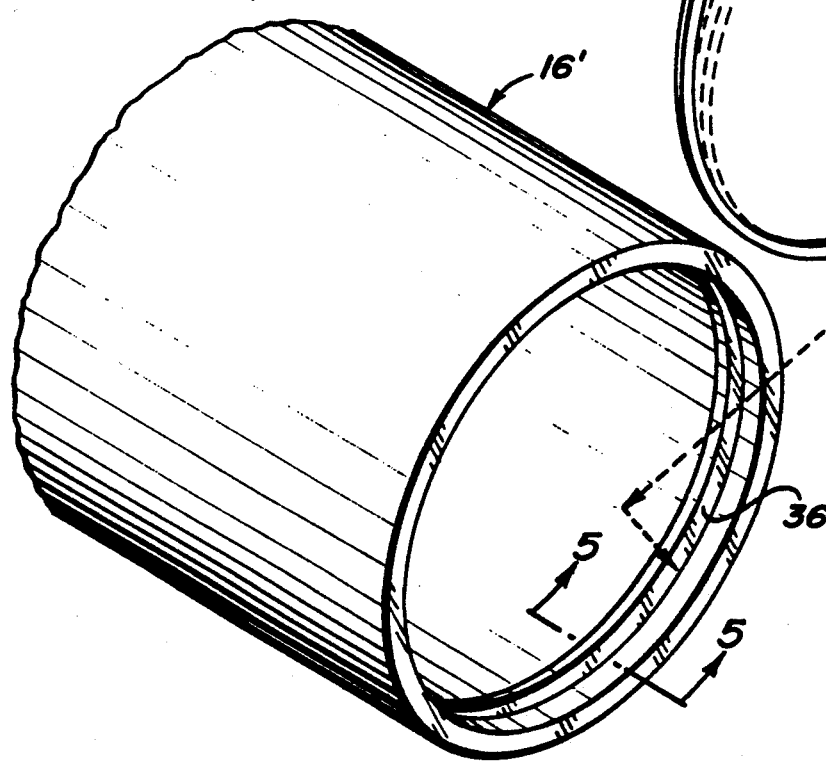
FIG. 4 is an exploded perspective view of a further alternate tubular member, such as plastic, to be joined by an expandable joint member according to this invention.

FIGS. 4 and 5 illustrate a further embodiment to the manner of receiving the projections 22,22'. Specifically, tubular member 16', along its inner wall, has been provided with a continuous slot or groove 36. However, to again distribute the axial load and avoid notch sensitivity in the plastic wall, a metal ring 38 is provided. The ring 38, for example may comprise a steel rod, rectangular in cross-section, where the steel is characterized by sufficient flexibility to be snapped into seating engagement with groove 36. In FIG. 5 it will be seen that ring 38 lies adjacent to forward wall 40 of groove 36.

FIG. 6 is an alternative to the way of forming the continuous groove 36'. Similar to the tubular member embodiment of FIG. 2, the wall thickness is maintained by forming such groove in an enlarged annular section 42. Again, a flexible steel ring, not shown in FIG. 6, may be snapped into the groove 36'. By the use of a continuous groove 36,36' and ring 38, alignment of the coupline device 10 therein is avoided. And, the axial load is distributed throughout the ring 38.

FIGS. 7 and 8 represent a different approach from the previous embodiments in providing thrust restraint. In this embodiment, the tubular member has been provided with an external annular slot or groove 44.

Though not shown, a plurality of circumferentially arranged slots may be provided rather than the continuous groove. In each case, the expanding sleeve see FIG. 8 has been modified by the addition of a plurality of spaced-apart stud elements 50 projecting outwardly in a direction normal to the surface thereo9f, where such stud elements may be welded to the sleeve 12. In this case, such elements 50 are preferably threaded 52 to receive a thrust restraint member 54 and complementary nut 56 to compressively secure the thrust restraint member 54, as more fully explained in co-pending application filed concurrently with this application and identified as Ser. No. 07/843,557. The thrust restraint member 54 comprises a metal casting or forging, where such member includes at each end a shoulder 58 for seating in the annular groove 44 or individual aligned slots. In order to compress the metal thrust member 54 against the underlying tubular members 60, threaded nut 56 is provided for engagement with its corresponding stud element 50. It will be seen that as the nut 56 is threaded onto stud element 50 the sleeve 12 is drawn outward to apply further inner compression against the tubular members 60. Optionally, a metal snap ring 62 may be provided to help spread the load thereabout.

Finally, FIG. 9 represents an alternative for the tubular member 64 for low pressure applications, such as for heating and ventilation purposes. In this embodiment, the thin walled tubular member 64, i.e. sheet metal conduit, is provided with a plurality of through holes 66. That is, such through holes 66 replace the annular grooves or slots of the thicker walled previous embodiments.

I claim:

1. In combination with a pair of aligned tubular members joined in end-to-end relationship by an internal expansion coupling device, the combination comprising
   (a) each said tubular member characterized by the end thereof having at least one circumferentially disposed recess about its wall, and
   (b) an elongated open ended tubular joint member formed from at least one relatively rigid, rectangular sheet-like member, said member being defined by a pair of opposing sheet ends and a pair of opposing sheet sides, where the sheet ends overlap such that the end portions thereof lie contiguous with each other; and at least one pair of axially aligned raised projections about the formed tubular joint member;
   a continuous circumferential gasket sealing sleeve formed of an elastomeric material and overlapping each said sheet side about each open end of said tubular joint member, where said gasket sealing sleeve is adapted to lie adjacent to and be compressed against the inside wall of said tubular member; and
   means accessible externally thereof for expanding said sheet-like member to bring said sheet ends towards one another, whereby said extending sheet-like member uniformly urges said elastomeric gasket sealing sleeve against the inside walls of said tubular member thereabout and said raised projections into engagement with said at least one recess.

2. The combination according to claim 1 wherein said tubular members are plastic, said recesses are along the inner wall of the said tubular members, and metal reenforcing cups are provided in said recesses of the plastic tubular members.

3. The combination according to claim 2 wherein the tubular member recesses are integrally formed with the wall thereof.

4. The combination according to claim 2 wherein the tubular joint member is provided with two sets of annularly disposed raised projections, one set in close proximity to each said gasket sealing sleeve, for engagement with said at least one circumferentially disposed recess.

5. The combination according to claim 1 wherein the raised projections are struck from the body of said sheet-like member.

6. The combination according to claim 1 wherein the raised projections are integrally formed on the surface of said sheet-like member.

7. The combination according to claim 1 wherein said tubular members are plastic, and said at least one recess comprises a continuous annular groove defined by spaced-apart side walls about the inner wall thereof, and includes a metal ring within said groove adjacent one of said side walls of said groove.

8. The combination according to claim 7 wherein the tubular joint member is provided with at least two sets of annularly disposed raised projections, one set in close proximity to each said gasket sealing sleeve, for engagement with a corresponding one of said circumferentially disposed recesses.

9. The combination according to claim 8 wherein the raised projections are struck from the body of said sheet-like member.

10. The combination according to claim 8 wherein the raised projections are integrally formed on the surface of said sheet-like member.

11. The combination according to claim 1 wherein there are plural circumferentially disposed recesses about the outer wall of said aligned tubular members, and said tubular joint member includes means cooperating therewith to engage said recesses.

12. The combination according to claim 11 wherein said circumferentially disposed recess is a continuous annular groove.

13. The combination according to claim 12 wherein said last named means includes a plurality of threaded studs projecting from said tubular joint member, and overlying pressure applying members engaged with said studs in communication with the recesses in opposed tubular members.

14. The combination according to claim 11 wherein said circumferentially disposed recesses are a plurality of individual spaced apart recesses.

15. The combination according to claim 14 wherein said last named means includes a plurality of threaded studs projecting from said tubular joint member, and overlying pressure applying member engaged with said studs in communication with a pair of axially aligned recesses in opposed tubular members.

* * * * *